No. 788,532. PATENTED MAY 2, 1905.
H. HIGGIN.
TOP PROP NUT.
APPLICATION FILED NOV. 10, 1903.
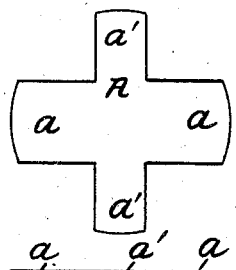
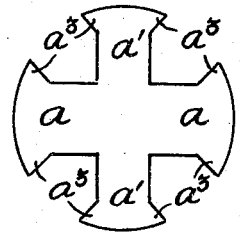 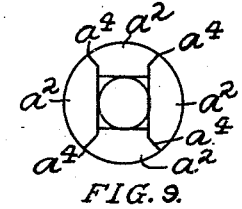
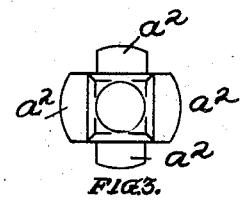
 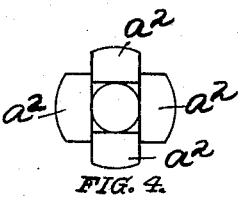 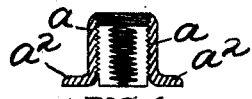
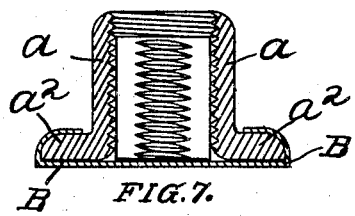
Witnesses
Earle R. Passel
Theo. W. Meader
Inventor
Henry Higgin
By Attorneys
Parkinson + Richards No. 788,532. Patented May 2, 1905.

UNITED STATES PATENT OFFICE.

HENRY HIGGIN, OF NEWPORT, KENTUCKY, ASSIGNOR TO THE HIGGIN MANUFACTURING COMPANY, OF NEWPORT, KENTUCKY.

TOP-PROP NUT.

SPECIFICATION forming part of Letters Patent No. 788,532, dated May 2, 1905.

Application filed November 10, 1903. Serial No. 180,529.

*To all whom it may concern:*

Be it known that I, HENRY HIGGIN, a citizen of the United States, residing at Newport, in the county of Campbell and State of Kentucky, have invented certain new and useful Improvements in Top-Prop Nuts, of which the following is a specification.

Top-prop nuts are usually made of cast-iron properly threaded. The cast-iron is very brittle and easily broken, and its weight is out of proportion to its strength.

The object of my invention is to provide a top-prop nut which may be made of wrought iron or steel and be both light and strong.

My invention consists in the top-prop nut hereinafter described and claimed.

In the drawings, Figures 1 and 2 are a plan view and elevation, respectively, of the blank from which the nut is made; Fig. 3, a top plan view of the nut without the head-cap. Figs. 4, 5, and 6 are respectively a bottom plan view, a side elevation, and a vertical section corresponding to Fig. 3; Fig. 7, a vertical section, on an enlarged scale, of the completed nut; Fig. 8, a plan view of a modified form of blank for making the nut, and Fig. 9 a bottom plan view of the nut resulting from the form of blank shown in Fig. 8.

The nut is formed from a blank A, having wide flanges $a$ and narrow flanges $a'$. This blank is stamped into the form of a box, with wide flanges $a$ overlapping narrow flanges $a'$ to form the body of the nut, with a square opening at the head end and closed at the opposite end. The ends of flanges $a$ and $a'$ are turned outwardly to form head-flanges $a^2$. The closed end of the body of the nut is drilled or punched and a tap run through the nut, cutting complete threads in the hole in what was the closed end of the body of the nut and cutting incomplete threads in the interior sides of the body portion of the nut where the tap strikes the flat sides. Then a head-cap B is clenched over head-flanges $a^2$ to form a complete head and prevent the sides of the nut from bending outwardly under pressure. The head-cap B may be of any desired shape or form and ornamented to improve the appearance of the nut. By only partially threading the sides of the body portion I provide a construction in which the thread engagement is sufficiently strong and the body of the nut light and in a form adapted to be made by stamping or drawing ductile metal.

In Fig. 8 I have illustrated a modified form of blank to be used when a solid head-flange is desired and in Fig. 9 the nut resulting from the use of the form of blank shown in Fig. 8. In this form the outer ends of flanges $a$ and $a'$ are provided with side wings $a^3$, which when formed into the nut meet on lines $a^4$ to form a solid head-flange.

By this construction I produce a very strong and durable nut of uniform size and shape and one with a very smooth and regular exterior surface, which takes excellently lacquer or other ornamental coating.

I claim as my invention—

1. A nut having a threaded top; sides which consist of four flanges extending from the top piece and bent into box form, said sides being partially threaded to correspond with the threads in the top piece, substantially as specified.

2. A nut having a threaded top; sides which consist of four flanges extending from the top piece and bent into box form, said sides being partially threaded to correspond with the threads in the top piece; and a cap clenched over the ends of said sides and adapted to prevent spreading thereof, substantially as specified.

3. A nut having a threaded top; sides which consist of four flanges extending from the top piece and bent into box form, said sides being partially threaded to correspond with the threads in the top piece; a head-flange consisting of extensions of the side flanges; and a head-cap clenched over the head-flange and adapted to prevent spreading thereof, substantially as specified.

HENRY HIGGIN.

Witnesses:
AGNES B. GRANT,
BRAYTON G. RICHARDS.